United States Patent Office 2,718,473
Patented Sept. 20, 1955

2,718,473

METHOD FOR FLAME SPRAYING POLYETHYLENE

John B. Powers, Metuchen, N. J., assignor to Union Carbide and Carbon Corporation, a corporation of New York No Drawing. Application February 26, 1953, Serial No. 339,187

8 Claims. (Cl. 117—49)

The present invention relates to the coating of objects with polyethylene and, more particularly, to a method wherein powdered particles of polyethylene are sprayed, heated in transit by means of flames, and deposited on the surfaces of objects to form a continuous coating.

It is known that polyethylene, as such, will not sufficiently adhere to a metal surface to form a suitable coating. In the copending application Serial No. 181,666, filed August 26, 1950 by J. B. Powers and R. E. Bludeau, now Patent No. 2,643,955, and entitled "Method of and Apparatus for Flame Spraying Polyethylene," a method is disclosed for flame spraying particles of polyethylene to produce continuous coatings on surfaces of objects. In that method adhesion of polyethylene to metal surfaces is achieved because of the partial thermal oxidation of a small portion of polyethylene to form carboxyls and carbonyls which have good adhesive characteristics. It was found that when the temperature of the interface between the surface of the metal object to be coated and the first layer of polyethylene is about 425° F., the adhesive force of the layer equals the cohesive force of the layer. Any attempt to strip a layer of polyethylene coating applied at a temperature below about 425° F. from the base metal surface will result in an adhesive failure and a removal of the layer; any attempt to strip a layer applied at a temperature above about 425° F. will result in a cohesive failure and a tearing of the coating rather than a separation from the base metal. The method of application Serial No. 181,666 therefore teaches the application of flame sprayed polyethylene to metal surfaces wherein the interface temperature is in excess of 425° F.

While the method of application Serial No. 181,666, now U. S. Patent 2,643,955, is in most respects satisfactory, it has been found that it is difficult to maintain the metal surface temperature sufficiently above 425° F., the temperature required to insure good coating adhesion, and sufficiently below 525° F. the temperature at which burning of the resin occurs.

It is, therefore, the main object of the present invention to provide a method for applying polyethylene coatings to metal surfaces by flame spraying wherein lower application temperatures may be employed.

Another object is to provide a method for applying adherent polyethylene coatings to metal surfaces by flame spraying while insuring against excessive decomposition of any portion of the coating.

A further object is to provide a faster and more economical method for applying adherent polyethylene coatings to metal surfaces by flame spraying wherein less heat is required to be supplied to the base metal prior to the deposition of polyethylene.

Other aims and advantages will be apparent from the following description and appended claims.

In accordance with the method of the present invention a flame-heated, air-shielded, powdered mixture of polyethylene containing between 0.5% to 2% by weight of anatase form of titanium dioxide is carried in an air stream and deposited on the heated metal surface to be coated. While in flight the powdered mixture is heated by means of at least one high temperature flame. The stream of powdered mixture is protected from attaining severely high temperatures by means of a stream of compressed air shielding the powdered stream from the high temperature flame.

It has been found that when the powdered polyethylene-anatase mixture containing between approximately 0.5% and 2% by weight of anatase ($TiO_2$), a well adhered coating of polyethylene can be applied to a metal surface which has been heated only to about 350° F. Since the rate of decomposition is a function of the temperature, the danger of polyethylene decomposition (depolymerization) occurring at this temperature is materially less than occurs at the higher application temperatures.

It is presently believed that the presence of the stated small percentage of anatase (titanium dioxide) serves to catalyze the polyethylene reaction. A slight amount of oxidation is necessary in obtaining an adherent polyethylene coating. By employing a catalyst, such as anatase, it is believed that controlled oxidation is achieved at lower temperatures without the corresponding depolymerization. It is, therefore, possible to obtain controlled oxidation to produce an adherent coating and at the same time eliminate the corresponding depolymerization which occurred in prior art methods whenever an adherent coating was obtained.

It has been found that at least about 0.5% by weight $TiO_2$, in the crystalline form known as anatase, is required in the powdered mixture in order to sufficiently catalyze the reaction and allow application of an adherent coating at the desired temperatures, i. e., between about 300°–325° F. When the percentage of $TiO_2$ in the mixture is increased above about 1% no appreciable benefits are obtained. As the percentage of $TiO_2$ (anatase) is further increased to about 5%, or above, the physical properties of the as-formed coating are changed, e. g., produce reduction in elongation and reduction in tensile strength of the coating. It is, of course, understood that the polyethylene powder material employed in the present invention consists essentially of polyethylene and may include pigments, stabilizers, and other additives in minor amounts.

What is claimed is:

1. In the process of flame spraying from a gun upon a metal surface to produce an adherent coating of a polyethylene, wherein a powdered stream consisting essentially of finely-divided polyethylene particles is carried from said gun in compressed air, heated to a temperature in excess of 221° F. by the proximity of high temperature gaseous products of combustion at a location spaced from said powdered stream and shielded therefrom by means of a stream of air, and deposited on the preheated metal surface to be coated, the improvement which comprises preheating said metal surface to a temperature in excess of about 300–325° F. and adding titanium dioxide in the anatase crystalline form to said powdered stream consisting essentially of polyethylene to produce a powdered mixture containing about 0.5% to 2.0% by weight of titanium dioxide.

2. A process in accordance with claim 1, wherein said powdered mixture contains approximately 0.5% by weight of titanium dioxide.

3. In the process of flame spraying from a gun upon a metal surface to produce an adherent coating of polyethylene, wherein a powdered stream of finely-divided polyethylene particles is carried from said gun in compressed air, heated to a temperature in excess of 221° F. by the proximity of high temperature gaseous products of combustion at a location spaced from said powdered stream and shielded therefrom by means of a stream of air, and deposited on the preheated metal surface to be coated, the improvement which comprises preheating said metal surface to a temperature in excess of about 300–325° F. and adding titanium dioxide in the anatase crystalline form to said powdered stream of polyethylene to produce a powdered mixture containing 0.5% to 2% by weight of titanium dioxide.

4. A process in accordance with claim 3, wherein said powdered mixture contains approximately 0.5% by weight of titanium dioxide.

5. The process of flame spraying from a gun upon a metal surface to produce an adherent coating comprising forming an air-borne powder stream of finely-divided particulate mixture of polyethylene and titanium dioxide in the anatase crystalline form, said particulate mixture containing about 0.5% to 2.0% by weight of titanium dioxide and the remainder consisting essentially of polyethylene; preheating said metal surface to a temperature in excess of about 300–325° F.; heating said air-borne powder stream to a temperature in excess of 221° F. by the proximity of high temperature gaseous products of combustion at a location spaced from said powder stream and shielded therefrom by a stream of air; and depositing on said preheated metal surface said heated air-borne powder stream.

6. A process in accordance with claim 5, wherein said powdered mixture contains approximately 0.5% by weight of titanium dioxide.

7. A process of flame spraying from a gun upon a metal surface to produce an adherent coating comprising forming an air-borne powder stream of finely-divided particulate mixture of polyethylene and titanium dioxide in the anatase crystalline form, said particulate mixture containing about 0.5% to 2.0% by weight of titanium dioxide and the remainder of polyethylene; preheating said metal surface to a temperature in excess of about 300°–325° F.; heating said air-borne powder stream to a temperature in excess of 221° F. by the proximity of high temperature gaseous products of combustion at a location spaced from said powder stream and shielded therefrom by a stream of air; and depositing on said preheated metal surface said heated air-borne powder stream.

8. A process in accordance with claim 7, wherein said powdered mixture contains approximately 0.5% by weight of titanium dioxide.

References Cited in the file of this patent

UNITED STATES PATENTS 2,643,955      Powers et al. _____ June 30, 1953